April 8, 1958     S. KELLER     2,829,926
FLUID PRESSURE BRAKE

Filed Oct. 11, 1951     2 Sheets-Sheet 1

INVENTOR
Siegfried Keller
BY

ATTORNEYS

April 8, 1958
S. KELLER
2,829,926
FLUID PRESSURE BRAKE
Filed Oct. 11, 1951
2 Sheets-Sheet 2
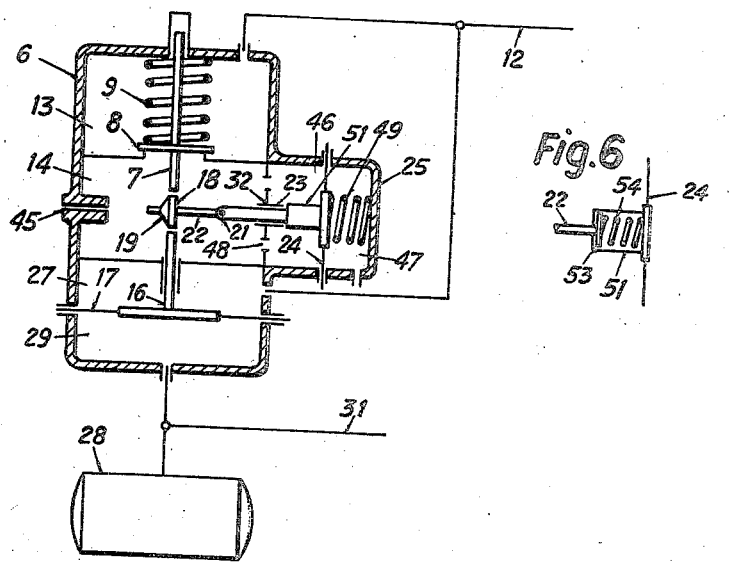
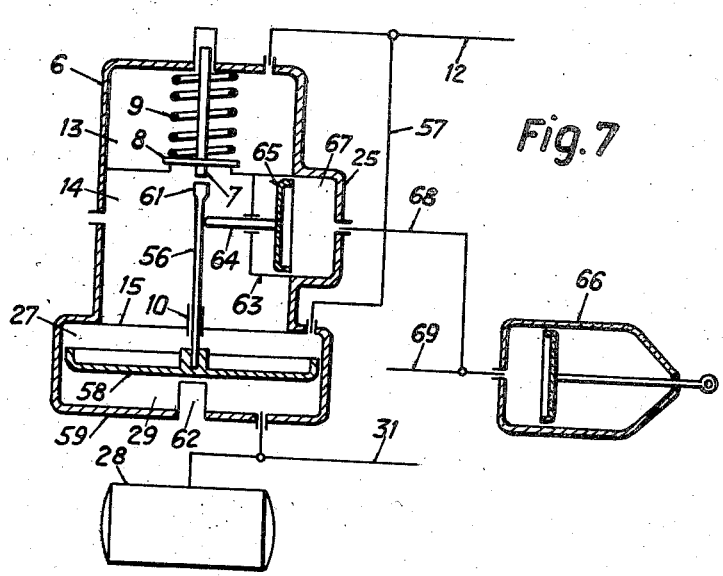
INVENTOR
Siegfried Keller
BY
Richard J Geier
ATTORNEYS

United States Patent Office 2,829,926
Patented Apr. 8, 1958

2,829,926

FLUID PRESSURE BRAKE

Siegfried Keller, Effretikon, Switzerland, assignor to Machine Tool Works Oerlikon, Administration Company, Zurich-Oerlikon, Switzerland, a Swiss company Application October 11, 1951, Serial No. 250,838

2 Claims. (Cl. 303—38)

The present invention relates to a fluid pressure brake equipment which operates according to variations in brake pipe pressure to control the application and release of the brakes. More particularly the invention is concerned with an accelerator for effecting a local quick service reduction in brake pipe pressure. In my Patent No. 2,595,466 a fluid pressure brake is described in which an accelerator valve for venting compressed air from the brake pipe and an operating part movable under the influence of a pressure drop in this pipe for opening the valve are provided. For transmitting the movement of the operating part of the movable valve body of the valve a body is provided which can be moved by moving the operating body from a rest position, in which it forms a mechanical connection between the operating part and the valve body, to an operative position in which the said connection is interrupted. Therefore, if the body is moved from the rest position to its operating position the valve is at first opened and, after the mechanical connection has been interrupted, is made independent of the operating part in order that it may be closed.

A brake of this type has the disadvantage that the time between the opening of the valve and the interruption of the mechanical connection between the opening part and the valve body can only with great difficulty be adjusted to the widely differing venting times necessitated by the varying composition of the railway trains.

The main object of the present invention is the elimination of this disadvantage and the construction of the brake in such a way that the moment of the interruption of the said mechanical connection can be chosen arbitrarily within wide limits, whereby the time of venting of compressed air from the brake tube can be adapted to the prevailing conditions.

In a preferred embodiment of the invention a pneumatical device is provided for interrupting the said mechanical connection which is operated by a pressure variation caused by the braking action and thereby moves the body from the rest position to the operative position in which the connection is interrupted.

Some embodiments of the invention will now be described with reference to the drawing. In the drawing, Figs. 1 and 2 are diagrammatic sectional views of a first embodiment with a pneumatical device operating on the pressure drop in the main air pipe whereby the rest position is shown in Fig. 1 and the operating position is shown in Fig. 2;

Figs. 3 and 5 are diagrammatic sectional views of two further embodiments, the pneumatic devices of which also operate in accordance with the pressure drop in the main pipe;

Figs. 4 and 6 are detail views of the embodiments shown in Figs. 3 and 5, and

Fig. 7 is a diagrammatic sectional view of an embodiment the pneumatic device of which operates on the pressure created on braking in the brake cylinder.

Figure 1:
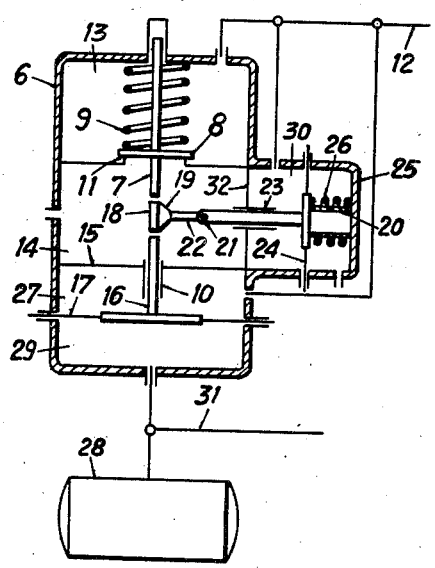

As shown in Fig. 1, a valve body 7 with an attached valve disk 8 is slidably disposed in a casing 6. The disk 8 is normally pressed on to its seat 11 by the spring 9 so that the chamber 13 connected to the main air pipe 12 is closed against the lower chamber 14. In a guide sleeve 10 fastened in the separating wall 15 the plunger 16 is arranged coaxial to the valve body 7. The lower end of the plunger 16 is attached to a membrane 17 fitted into the wall of the casing 6. Between the upper end of the plunger 16 and the lower end of the valve body 7 a cylindrical body 18 is inserted the left side of which—as shown in Fig. 1—forms a conical part 19 and the plunger 22 fitted with a joint 21. The latter is slidably guided in the sealing guide sleeve 23. Its right end (in Fig. 1) is fastened to a membrane 24 the edge of which is seated in the wall of the casing part 25. The chamber 30 extending between the membrane 24 and the separating wall 32 is directly connected to the main air pipe 12. In the chamber between the membrane 24 and the casing wall 25 which is connected to the atmosphere a spring 26 is arranged which tends to move the membrane 24 from the rest position, shown in Fig. 1, in which it rests against the sleeve 20 acting as a stop into the operating position shown in Fig. 2. The plunger 16 is led through a sealing opening in the separating wall 15. The latter separates the chamber 14 from a further chamber 27 which is directly connected to the main air pipe 12 and the pressure of which acts on the membrane 17. Below the latter the chamber 29 is arranged which is connected to the usual auxiliary air container.

Operation of the device shown in Fig. 1 is as follows:

Let it be assumed that the main air pipe 12 is under operating pressure. The membranes 17 and 24 are in their rest position, as shown in Fig. 1, since the same pressure prevails on both sides of the membrane 17 and since the force of the main air pipe pressure acting upon the membrane 24 is larger than the force of the spring 26. The valve disk 8 is pressed against its seat due to the action of the spring 9 and the main air pipe pressure, so that no venting of compressed air from the main air pipe 12 takes place. If the pressure in the latter is reduced by a small amount, for instance by the engine driver, the pressure in the chamber 27 is also reduced while the operating pressure in the chamber 29 still remains the same. Under the action of the two different forces the membrane 17 is bent upwardly until it rests against the guide sleeve 10 serving as an abutment. Thereby the movement of the membrane is transmitted through the plunger 16, body 18 and valve body 7 to the valve disk 8, whereby the body 18 is rotated about the joint 21 through a small angle. The valve disk 8 is lifted and compressed air is vented from the chamber 13 and the main air pipe 12 connected thereto through the chamber 14 to the surrounding atmosphere. Thereby the pressure in the pipe 12 is further reduced in known manner and the initial pressure reduction in the latter is further assisted. During the subsequent charging of the brake cylinder (not shown) over the pipe 31 the pressure in the chamber 29 drops to a certain value which is higher than the pressure in the main air pipe 12 so that the membrane 17 remains in its operating position shown in Fig. 2. When the pressure in the pipe 12 has dropped to a certain value sufficient for obtaining the accelerator effect the force of the spring 26 overcomes the pressure in the chamber 30 and the plunger 22 is moved to the left to the operating position shown in Fig. 2. This value depends on the reduction of pressure in the main air pipe 12 operated by the driver; this value is always slightly higher than the corresponding pressure in the main air pipe after a reduction of pressure in the latter. Thereby, the valve body 7 slides along the conical part 19 of the body 18 under the action of the spring 9 until the valve disk 8 rests against its seat 11 and interrupts the venting.

Figure 2:
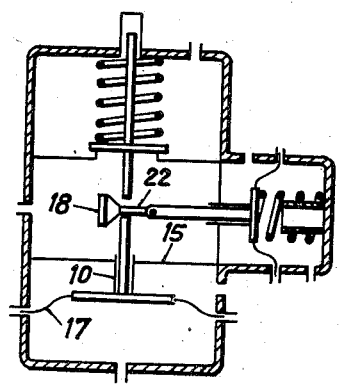

Further pressure drops in the main air pipe do not affect the mechanism as the membrane 17 is prevented from any further upward movement by the guide sleeve 10 and the body 18 also remains in the position shown in Fig. 2. When the brake is released compressed air from the main pipe 12 is led into the chambers 9, 27 and 30, whereupon the membrane 17 is first returned to its rest position, as the pressure rise in the auxiliary container 28 which is also filled, through the pipe 31 in a manner not shown in detail, from the main air pipe, is slower than in the main air pipe. The body can now move between the valve body 7 and the plunger 16 without hindrance. When the pressure in the main air pipe 12 surpasses the value at which, during braking, the spring 26 was able to move the membrane 24 to its operating position, the membrane 24 returns, together with the body 18, to its rest position shown in Fig. 1. The mechanism is now ready for another venting of air from the main air pipe 12.

Figure 3:
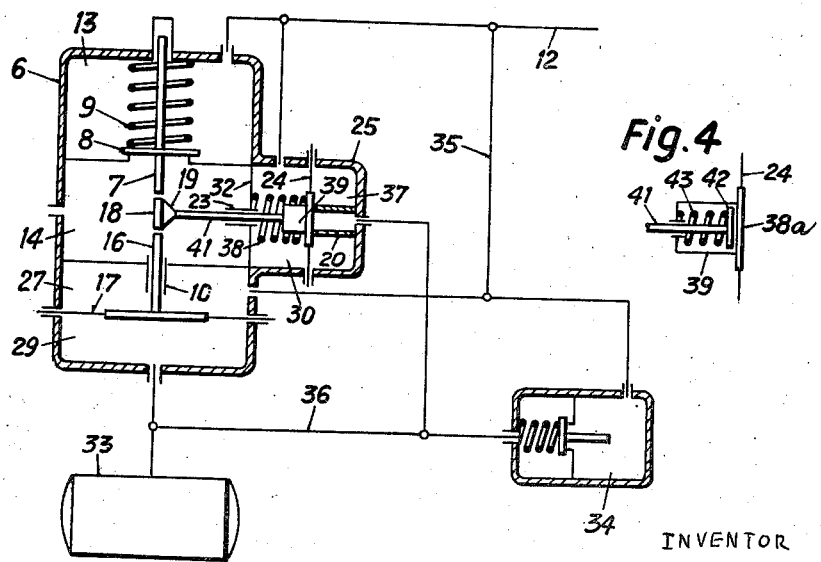

In the embodiment shown in Fig. 3 the valve body 7 with the valve disk 8 is arranged in the casing 6 in the manner as in Fig. 1. The valve disk 8 controls the passage of air from the chamber 13 directly connected to the main air pipe 12 to the chamber 14, which is always connected to the surrounding atmosphere. The plunger 16 fastened to the membrane 17 also passes from the chamber 27 through the guide sleeve 10 serving as a seal to the chamber 14, as shown in Fig. 1. The chamber 27 is directly connected to the main air pipe 12, the chamber 29 is in direct connection with control air container 33. This container is charged from the pipe 12 through the branch pipe 35, the non-return valve 34 and the pipe 36.

Figure 4:
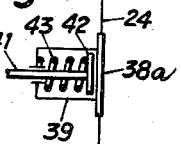

As in Fig. 1, a casing part 25 is attached to the casing 6 into which the edge of a membrane 24 is fitted. A separating wall 32 provided with a guide sleeve 23 closes the inside of the casing part 25 against the chamber 14. The membrane 24 forms two chambers 30 and 37 of which the former is connected to the main air pipe and the latter through the pipe 36 to the control air container 33. In the chamber 30 a spring 38 is arranged which presses the membrane 24 in the shown rest position against the abutment 20 in the chamber 37. As shown in Fig. 4, the membrane carries a disk 38a to which a sleeve 39 open at one end is fastened. A rod 41 is slidably arranged in this sleeve which carries at the end projecting into the sleeve a spring support 42. A spring 43 in the sleeve 39 rests against the support 42 on the rod 41 and against the bottom of the sleeve 39. The other end of the rod 41 carries a cylindrical body 18 fitted with a conical part 19. The rod 41 is made resilient so that the body 18 can be moved upwards and downwards by a small amount.

The operation of the device shown in Figs. 3 and 4 is as follows:

In normal position, i. e. when the brake is released, normal operating pressure prevails in the main air pipe 12 and in the chambers 13, 27 and 30. As the control air container 33 is also charged to this pressure the same pressure also prevails in the chambers 29 and 37. If the pressure in the main air pipe is reduced the pressure in the chambers 27 and 30 also drops so that the membrane 17 is bent upwards and through the mechanical connection formed by the parts 16, 18 and 7 lifts the valve disk 8 from its seat. The main air pipe 12 is therefore partially vented to the surrounding atmosphere through the chambers 13 and 14, as was described with reference to Fig. 1. The pressure drop in the chamber 30 does not result in an immediate bending of the membrane 24 due to the spring 43. The membrane 24 is only actuated after the pressure in the main air pipe 12 has been reduced by a predetermined value, sufficient to obtain the accelerator effect. At this moment, the rod 41 is moved to the left, whereby the body 18 slides away from between the plunger 16 and the valve body 7 and the mechanical connection between these parts is interrupted. Due to the action of the spring 9 the valve 7, 8 is closed and thereby the venting of the main air pipe 12 is interrupted. On releasing the brake, the membrane 17 remains, in contrast to the embodiment shown in Fig. 1, in the bent position until the pressure in the chamber 27 has almost reached the normal operating value. However, the membrane 24 is earlier returned to its rest position under the influence of the pressure in the chamber 30 and the action of the spring 43. Thereby the rod 41 is at first not moved and only the spring 43 is compressed. This prevents the body 18 from moving between the parts 7 and 16 before the membrane has been returned to normal position. Inadvertent venting of compressed air from the main pipe 12 during the release operation is therefore not possible. When the membrane 17 has also returned to its rest position at the end of the release operation the spring 43 pulls the body 18 back between the parts 16 and 7 and all parts have returned to the initial position shown in Fig. 3. The mechanism is now ready for another venting of compressed air from the main air pipe 12. It is apparent that pressure in the container 33 is maintained constant during any braking action.

In the embodiment shown in Fig. 5 the arrangement of the valve 7, 8 and the membrane 17 corresponds exactly to the embodiment shown in Fig. 1. The chamber 13, closed by the valve 7, 8, as well as the chamber 27 are connected to the main air pipe 12 whereas the chamber 29 is directly connected to the auxiliary air container. Into the wall of the casing part 25 attached to the casing 6 the edge of a membrane 24 is fitted which divides the interior of this casing part in two chambers 46 and 47. Similar to Fig. 3, a sleeve 51 is fastened to the membrane 24. As shown in detail in Fig. 6 one end of a rod 22 is slidably arranged in the sleeve 51, which carries a spring support plate 53. Between the latter and the membrane 24 a spring 54 is arranged which tends to press the support plate 53 against the base of the sleeve 51. The rod 22 fitted with a joint 21 carries at its left end the cylindrical body 18 which is fitted, on its left side, with a conical part 19. The chamber 47 is directly connected to the surrounding atmosphere while the chamber 46 is connected to the chamber 14 by openings 48 in a wall 32 carrying the guide sleeve 23 for the rod 22. In the rest position of the membrane shown in Fig. 5 the membrane is pressed against the guide sleeve 23 serving as an abutment, by a spring 49 arranged in the chamber 47.

The operation of the mechanism shown in Fig. 5 is as follows:

In normal position, corresponding to the released position of the brake, the chambers 13 and 27 are subjected to the operating pressure prevailing in the main air pipe. The air in the chamber 29 has the same pressure, since the auxiliary air container is charged through the pipe 31 to normal operating pressure in a manner not shown. The chambers 14, 46 and 47 are vented to the atmosphere. If the pressure in the main air pipe 12 is reduced, the pressure in the chamber 27 is also lowered while the pressure in the chamber 29 remains the same at first, until the charging of the brake cylinder from the auxiliary air container 28 through the pipe 31 begins. Consequently the membrane 17 is bent upwards and transmits its motion through the body 18 to the valve body so that the valve disk 8 is lifted from its seat and compressed air flows from the main air pipe 12 through the chamber 13 into the chamber 14. The latter, together with the chamber 46 is charged through throttle bore 45 until eventually the pressure acting on the membrane 24 overcomes the force of the spring 49 and the membrane is moved to the right together with the rod 22. The throttle bore 45 prevents a quick escape of compressed air entering through the valve 8. By suitably selecting the diameter of this bore in relation to the volume of the chamber 14 the pressure in the chamber 14 may be made to increase slowly during the withdrawing of compressed air from the air pipe 12 up to the closing of the valve 8. The valve body 7 therefore slides down along the conical part 19 under the action of the spring 9 and closes the valve 7, 8. This interrupts the venting of compressed air from the main air pipe 12 and the air enclosed in the chambers 14 and 46 slowly escapes through the throttle bore 45. Under the action of the spring 49 the membrane 24 is returned to its rest position whereby the sleeve 51 is moved to the left. The movement of the latter cannot be transmitted to the rod 22 at first and the spring 54 is compressed. The mechanical connection between the plunger 16 and the valve body 7 remains interrupted until the brake is released. If, for this purpose, the main air pipe 12 is charged to operating pressure the membrane 17 returns to its normal position under the effect of the pressure in the chamber 27 which rises faster than the pressure in the chamber 29 charged by the pipe 31. This enables the body 18 to resume its position between the plunger 16 and the valve body 7 under the action of the spring 54. The mechanism is now ready for another venting of compressed air from the main air pipe 12.

In the embodiment shown in Fig. 7, a chamber 13 is provided in the upper part of the casing 6. The chamber 13 is connected to the main air pipe and has an exit to the chamber 14 connected to the surrounding atmosphere which is normally closed by the disk 8 of the valve body 7. The chamber 14 is separated from the chamber 27, connected to the main air pipe 12 by a branch pipe 57, by a separating wall 15 which is fitted with a sealing guide sleeve 10 for the rod 56. The chamber 27 is arranged in an extension 59 of the casing 6. In this extension, a piston 58 is slidably mounted to the middle of which the rod 56 is rigidly attached. The lowest part of the extension 59 forms a chamber 29 connected to the auxiliary air container 28 and closed by the piston 58. The rod is made resilient so that its free thickened end 61 can be moved transversely to the sliding direction of the piston 58. In the shown rest position of the piston 58 in which the latter rests against an abutment 62, the end 61 of the rod 56 is immediately below the valve body 7 and thus froms a mechanical connection between the latter and the piston 58. In a lateral extension 25 of the casing 6 a cylinder 63 is arranged in which a piston 65 carrying a plunger 64 is slidably disposed. The piston 65 closes the chamber 67 connected to the normal charging and venting pipe 69 of the brake cylinder 66 by means of the pipe 68.

The operation of the embodiment shown in Fig. 7 is as follows:

In normal position, i. e. with the brake released and the main air pipe 12 charged to normal operating pressure, normal pressure prevails in the chambers 13 and 27 as well as in the chamber 29 as the latter is connected in a manner not shown in the drawing, to the auxiliary air container 28 also charged to normal operating pressure. The chambers 14 and 67 contain air at atmospheric pressure, since the brake cylinder 66 is vented through the pipe 69. A pressure reduction in the main air pipe 12 is first transmitted to the chamber 27 but not to the chamber 29 since, at this moment, the charging of the brake cylinder by the auxiliary air container 28 has not yet begun. Under the action of the pressure difference in the chambers 27 and 29 the piston 58 is moved upwards, whereby this movement is transmitted by the rod 56, to the valve body 7 and the valve 7, 8 is opened. The pipe 12 is now vented through the chambers 13, 14 until the valve 7, 8 is closed again. During this venting the normal three-pressure regulator (not shown) is actuated and connects the pipes 31 and 69, so that the brake cylinder 66 is charged by the auxiliary air container 28. The pressure rise in the brake cylinder 66 is transmitted through the pipe 68 to the chamber 67 so that the piston 65 is moved to the left. Thereby the plunger 64 abuts against the rod 56 bending the latter to the left so that the head 61 slides away from under the valve body 7. The spring 9 now closes the valves 7, 8 thereby limiting the venting of compressed air from the main air pipe 12. The rod 56 remains in the displaced position until the brake cylinder is almost completely vented, whereas the piston 58 returns to normal position already at the beginning of the release operation. Instead of the pistons 58 and 65 shown in Fig. 7 membranes with sealed edges could, of course, be used as well as in the previous examples.

I claim:

1. In a fluid pressure brake in combination with a brake pipe; a connection between the brake pipe and the atmosphere for venting fluid pressure from the brake pipe; a valve controlling said connection; loading means for said valve to keep the latter normally in the closed position; actuating means for said valve provided with further loading means and connected with said brake pipe, said actuating means being operable by a reduction of brake pipe pressure under the opposing effects of the latter pressure and of the second-mentioned loading means; a coupling means normally forming a mechanical connection between said valve and said actuating means, said coupling means being movably arranged to transmit the movement of said actuating means to said valve and further being operable for interrupting the said mechanical connection; a member operatively connected with said coupling means for operating said coupling means; actuating means for said member, said latter actuating means comprising a pressure chamber, said member being movably disposed in said pressure chamber, and loading means for said latter actuating means, whereby said latter actuating means are operated by the opposing effects of pressure in said chamber and of the last-mentioned loading means; and fluid pressure supply means connected with said pressure chamber and controlling pressure in the pressure chamber depending upon pressure in the brake pipe, whereby said member is operated upon a predetermined drop of pressure in the brake pipe to close said valve by the first-mentioned loading means.

2. In a fluid pressure brake in combination with a brake pipe; a connection between the brake pipe and the atmosphere for venting fluid pressure from the brake pipe; a valve controlling said connection, said valve comprising a valve body movable along an axis; loading means for said valve body to keep the latter normally in the closed position; actuating means for said valve body provided with further loading means and connected with said brake pipe, said actuating means being operable in a direction parallel to said axis by reduction of brake pipe pressure under the opposing effects of the latter pressure and of the second-mentioned loading means; a coupling means normally forming a mechanical connection between said valve body and said actuating means, said coupling means being movable in a direction parallel to said axis to transmit the movement of said actuating means to said valve body, said coupling means further comprising a part movable in a direction transverse to said axis for interrupting said mechanical connection; a member operatively connected with said part; actuating means for said member, said latter actuating means comprising a pressure chamber, said member being movably disposed in said pressure chamber, and loading means for said latter actuating means, whereby said latter actuating means are operated by the opposing effects of pressure in said chamber and of the last-mentioned loading means; and fluid pressure supply means connected with said pressure chamber and controlling pressure in the pressure chamber depending upon pressure in the brake pipe, whereby said member is operated upon a predetermined drop of pressure in the brake pipe to close said valve by the first-mentioned loading means.

References Cited in the file of this patent

UNITED STATES PATENTS

| | | |
|---|---|---|
| 1,895,483 | Neveu | Jan. 31, 1933 |
| 2,032,145 | Nelson | Feb. 25, 1936 |
| 2,032,169 | Farmer | Feb. 25, 1936 |
| 2,034,307 | McClure | Mar. 17, 1936 |
| 2,050,783 | Campbell | Aug. 11, 1936 |
| 2,595,466 | Keller | May 6, 1952 |